March 17, 1959 G. O. PERKINS 2,878,302
BUS JOINT COVER
Filed April 25, 1956 2 Sheets-Sheet 1
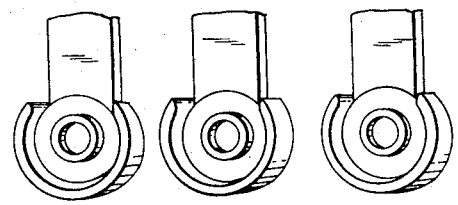
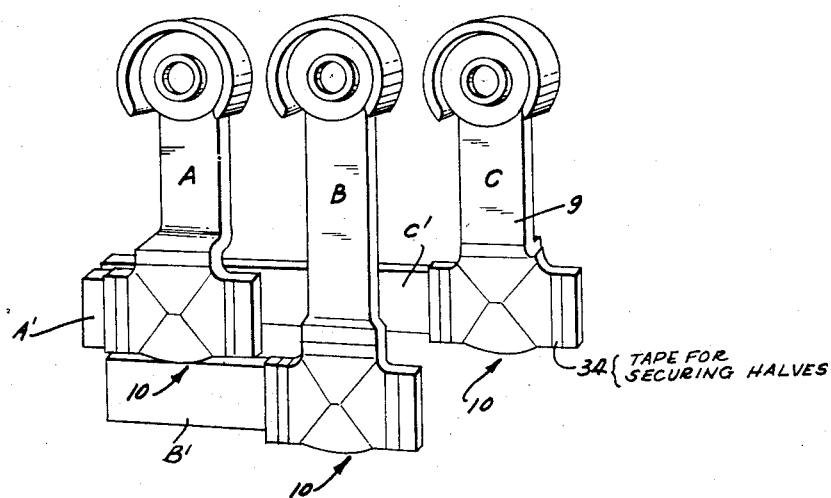
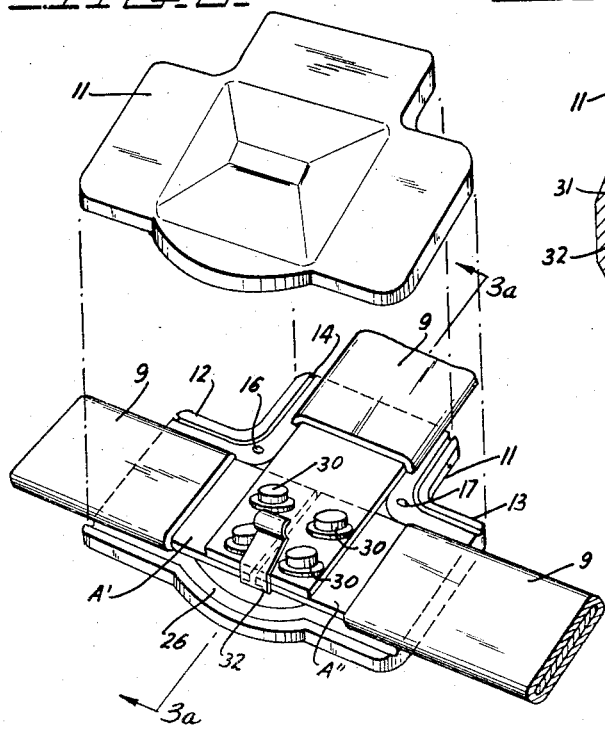
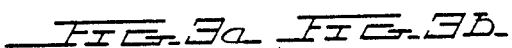
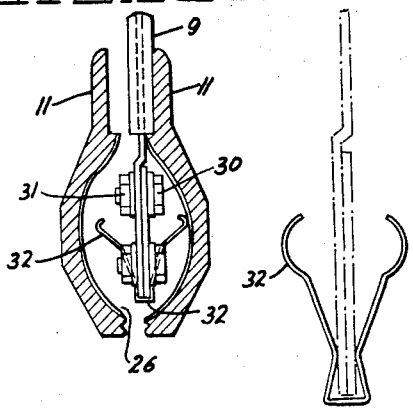
INVENTOR.
GORDON O. PERKINS
BY Ostrolenk, Faber,
Gerb & Soffen
ATTORNEY March 17, 1959 G. O. PERKINS 2,878,302
BUS JOINT COVER
Filed April 25, 1956 2 Sheets-Sheet 2
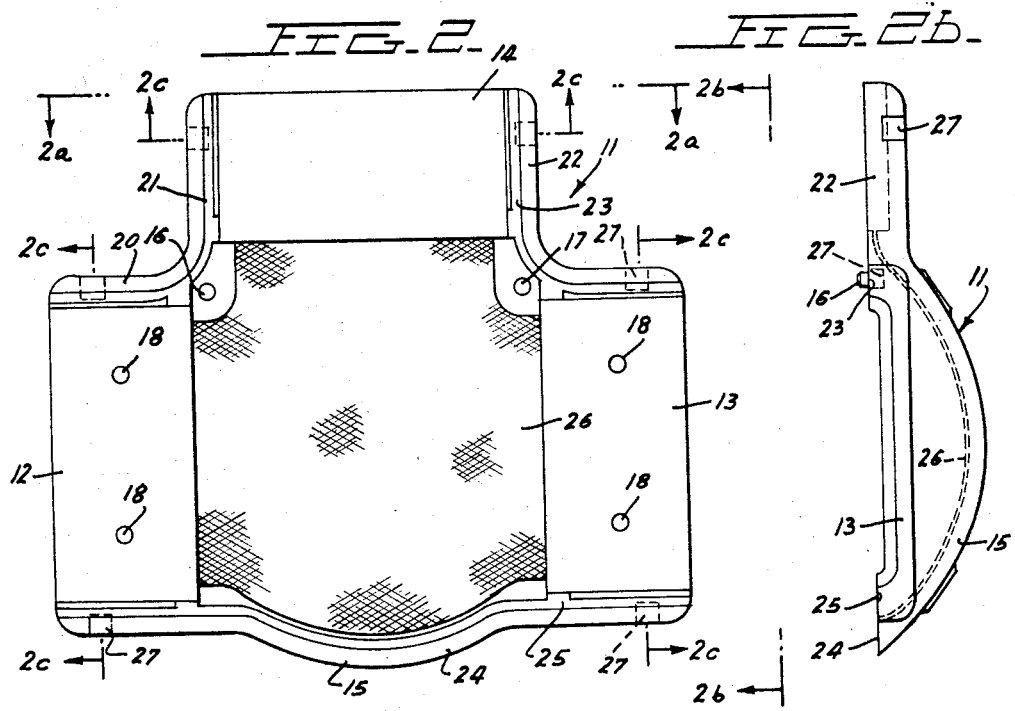
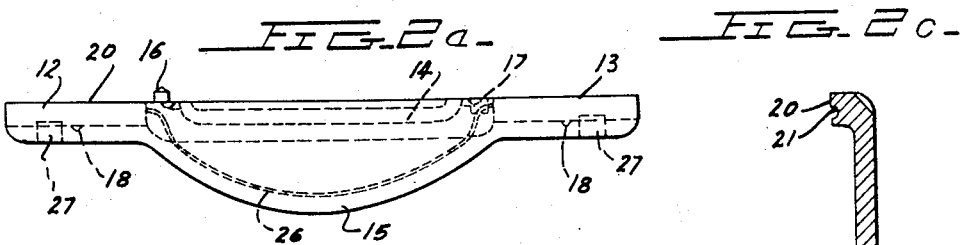
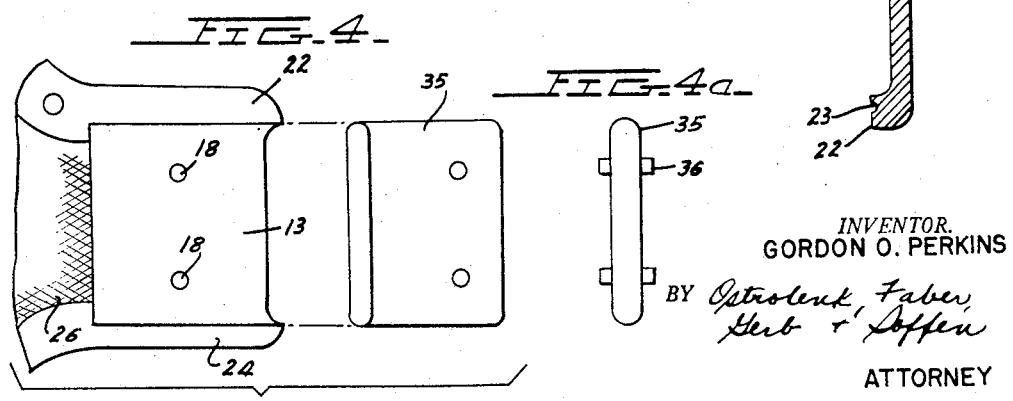
INVENTOR.
GORDON O. PERKINS
BY *Ostrolenk, Faber,*
*Gerb & Soffen*
ATTORNEY United States Patent Office 2,878,302
Patented Mar. 17, 1959

2,878,302

BUS JOINT COVER

Gordon O. Perkins, Philadelphia, Pa., assignor to I-T-E Circuit Breaker Company, Philadelphia, Pa., a corporation of Pennsylvania Application April 25, 1956, Serial No. 580,521

1 Claim. (Cl. 174—73)

My invention relates to bus joint covers and more particularly to a cover arrangement which does not require compound fill or wrapping with copper gauze and is readily removable and reusable. The bus bars of high voltage switchgear are provided with insulation which consists of rigid molded insulation sleeves which have the contour of the bus bar and are slipped over the bars. The insulation sleeves are of sufficient length to span the distance of a bus bar between connections. However, the insulating sleeve stops near the connections, and other means, such as bus joint covers, to which my instant invention is directed, are used.

That is, a bus joint cover for insulating bus bar connections is required where a joint of good electrical quality is required in order that a switchgear may meet its electrical requirements. Specifically the bus joint cover provides means for electrically nullifying sharp corners and edges to prevent corona formation and also provides sufficient dielectric strength for the equipment. Prior art devices for bus joint covers have the disadvantage of being expensive and non-reusable. For example, in one prior art arrangement, the bus joint cover must be filled with a compound in order to achieve the desired results. In another prior art arrangement although a flexible rubber cover is used, it is necessary to initially wrap the connections of the bus bars with a copper mesh or gauze. In some of these installations sealer is added to obtain a smooth contour over the wrapping of the hardware of the connection.

My present invention is directed to a bus joint cover wherein two similar or identical halves of rigid molded insulating material are contoured so that they can envelop the bus joint connection and still be spaced from the hardware forming the connection between the bus bars. However, the internal surface of the molded halves is covered with a conducting material such as a conducting paint. A conductive contact is placed in engagement with the ends of the bus bar and also in pressure engagement with the interior conductive surfaces of the bus joint cover. Thus, the smooth interior conductive surface assumes the same potential as the ends of the bus bar to thereby prevent corona formation.

Thus, with my novel arrangement it is not necessary to provide a compound filling for the interior of the bus joint cover nor is it necessary to initially wrap the bus bar connection with a conductive gauze or tape. Thus, my novel invention provides a novel bus joint cover which provides a means for obtaining an electrically sealing bus bar joint which is free of the effects of sharp corners and does not require wrapping with a conductive gauze or tape, is easily and readily applied by unskilled personnel and is reusable.

Accordingly, a primary object of my invention is to provide a novel solid bus joint cover made in two similar or identical halves wherein each half has a conductive internal surface which is engaged by a conductive contact which is also in engagement with the bus bar ends of the bus bar connection being protected by the cover.

Another object of my invention is to provide a solid bus joint cover wherein the internal surface of the insulating cover is provided with a coating of conductive paint so that a conductive contact which is in engagement at the bus bar connection is also in engagement with the conductive surfaces so that the surfaces are at the same potential as the bus bar connection.

A still further object of my invention is the provision of a conductive coating on the internal surface of a bus joint cover contoured and situated so that it will be engaged by a spring contact which is also in engagement with the bus joint connection to thereby prevent corona formation.

These and other objects of my invention will be apparent from the following description when taken in connection with the drawings in which:

Figure 1 is a back view of a switchgear compartment and illustrates the application of my novel bus joint cover.

Figure 2 is a side view of one of the two similar molded insulating halves of my novel bus joint cover.

Figure 2a is a top view taken in the direction of the arrows of 2a—2a of Figure 2.

Figure 2b is an end view taken in the direction of the arrows 2b—2b of Figure 2.

Figure 2c is a cross-sectional view taken in the direction of the arrows 2c—2c of Figure 2.

Figure 3 is a cross-sectional view of a T connection showing my novel bus joint cover.

Figure 3a is a cross-sectional view taken in the direction of the arrows 3a—3a of Figure 3.

Figure 3b is an enlarged view illustrating the shape of the stripped copper spring contact which engages the conductive internal surface of my novel bus joint cover.

Figure 4 is a view illustrating the manner in which the bus joint cover can be adapted for an L connection similar to that seen in Figure 1.

Figure 4a is an end view of the plug used in Figure 4.

Referring to the figures, I have illustrated in Figure 1 a typical application of my novel bus joint cover. A bus joint cover, such as 10, is used at each of the bus bar connections, as for example at the connection bus A' to bus A, at the connection of the bus B' to the bus B and also at the connection of the bus C' to the bus C.

Since the electrical connection of the adjacent buses such as A, A' necessarily results in sharp irregular surfaces due to hardware such as nuts and bolts utilized to electrically connect one bus to the other, it is necessary to provide means to prevent corona discharge from the sharp edges. Also it is necessary to provide adequate insulation of the buses of one phase from the other phases. Thus, although each of the buses has an insulated sleeve 9, which has the contour of the bus and hence can be slipped over the bus bars, the sleeve does not and cannot extend to the ends where the adjacent bus bars A, A' are connected to each other. Thus, the bus joint cover 10 is utilized at the connection of adjacent bus bars to nullify sharp corners and edges to prevent corona formation and also to provide sufficient dielectric strength for all the requirements.

The bus joint cover 10 may be made of two identical or similar halves of insulating molded material. Referring to Figures 2, 2a, 2b and 2c I have shown various views of one of the halves which is used in my novel bus joint cover. The half 11 is a rigid molded insulating material and is comprised of three legs 12, 13 and 14, with a center section 15. Each of the legs 12, 13 and 14 are contoured to receive the ends of a bus and a portion of its insulating sleeve 9, as illustrated in Figure 3. The half 11 is also provided with a protruding member 16 and a recess 17 which match, respectively, with a recess and protrusion on the other half with which it is eventually mated.

The internal surface of legs 12 and 13 is provided with recessions 18. The half 11 has three major mating surfaces identified as 20, 22 and 24, respectively, each of which is provided with a groove 21, 23, 25, a cross sectional view of which may be seen in Figure 2c. The center portion 15 has a smooth curved surface as may be seen by a comparison of Figures 2, 2a and 2b. The smooth interior curve is covered with a conducting material such as conducting paint, or the like 26 (shaded area of Figure 2). Each of the legs 12, 13 and 14 is provided with an external groove 27 which will be used as a guide for tape or cord to bind two halves together. Thus, basically each of the bus joint covers 10, which may be identical or similar in construction, is formed and contoured to envelop the bus bar connection and is provided with a center section 15 having an internal smooth curved surface which is covered with a conductive material 26.

Figures 3 and 3a illustrate the manner in which the halves 11 envelop the bus bar connection. In the T connection illustrated in Figures 3 and 3a, the bus bars A, A', A" are electrically connected to each other by means of the nut and bolts 30, 31. It is the sharp irregular surfaces of the halves of the bus bars and the nuts and bolts 30, 31 which could cause corona discharge unless means are provided whereby the potential is distributed over a smooth surface. The interior curved surface at the center portion 15 of the halves 11 are contoured so that they are spaced from the hardware 30, 31 when the halves 11 are positioned around the bus bar connection. However, a strip copper spring contact 32 is provided for the bus bar connection. The conductive contact 32 is preferably made of a resilient member having a substantially U shaped configuration with two legs which straddle the bus bar connection. Each of the legs is bent outwardly as best seen in Figures 3a and 3b so that although the base of the legs is in engagement with the bus bar connection, the free ends of the leg are bent toward the conductive surface 26. Hence, when the two halves 11 envelop the bus bar connection the free ends of the conductive contact 32 will be in engagement with the conductive surfaces 26 of the bus joint cover 10. That is, the light spring contact 32 takes the form of a thin strip of conductive material such as copper which is bent to clamp around the bus bars and also spring against the interior smooth curved conductive surface 26 of the halves 11. Thus, the smooth interior conductive surfaces 26 of the halves 11, due to their engagement by the conductive contact 32, will be at the same potential as the bus bar connection thereby preventing corona formation. At the same time each of the halves 11 being made of solid molded insulating material will provide sufficient dielectric strength between the bus bars of different phases to meet all necessary electrical requirements.

The mating surfaces 20, 22, 24 of the two identical or similar halves 11 can be filled with conventional electrical sealer or similar plastic material when the two halves are positioned together to envelop the bus bar connection. As is heretofore noted, each of the mating surfaces 20, 22, 24 has a groove, respectively, 21, 23, 25 which will trap sealer material thereby lessening the tendency for voids to be present. It should also be noted that the grooves 21, 23, 25 would also be helpful if a round extruded sealer is used since it would provide a convenient place to affix a sealer material. In addition to providing electrical sealer between the mating surfaces 20, 22 and 24 of the two halves 11, sealer will also be provided between the mating surfaces of the bus sleeve area at legs 12, 13 and 14 and the bus sleeves 9.

Thus, when the two identical or similar halves 11 are pressed together to envelop a bus joint there will be no air voids in the area filled by the sealer. However, air is present inside of the contoured section adjacent the conductive coating 26 and the irregular surfaces of the hardware 30, 31 and the ends of the bus bars A, A', A". The two halves 11 can be properly positioned with respect to each other as a result of the protrusion 16 and the recess 17 which match respectively with a recess and protrusion in the mating half. Thus, unskilled personnel can readily position the two halves 11 opposite one another and locate them properly with respect to one another due to the mating protrusions and holes 16, 17. After the two halves have been positioned to envelop the bus joint connection, they may be held together by any one of several methods, such as cord or tape 34 as seen in Figure 1, placed within the grooves 27.

Thus, with the simple structure which I have illustrated, it is possible to avoid corona discharge by providing smooth curved surface on the interior of the bus joint cover with a conductive coating which will be engaged by a contact which is also in engagement with the ends of the bus bars at their connection. Hence, the smooth conductive surface will be at the same potential as the bus bar connection thereby preventing corona discharge. Also, since the interior of the bus bar cover at the center section 15 does not necessitate filling with a compound nor wrapping with a copper gauze or tape, the entire assembly can be readily applied by unskilled personnel. Also, the assembly can be readily disassembled from a particular installation and is reusable.

In Figures 3 and 3a I have shown the manner in which the molding of Figure 2 can be used in a T type of connection. However, the same molding could also be used in an L type of connection such as illustrated in Figure 1. The manner in which this is achieved is by providing a plug 35 which has a similar contour to the bus sleeves 9. The insulating plug 35 is provided with protrusions 36 which are adapted to mate with openings 18. That is, the plug 35 is positioned within one of the legs or bus sleeve areas such as 13, in which there is no bus.

Thus, in summary, I have provided a novel bus joint cover which has a smooth curved interior surface coated with a conductive paint and, although spaced from the hardware at the bus joint connection is nevertheless engaged by a conductive contact which is also in engagement with the bus bar connection. Thus, the conductive coating also is at the same potential as the bus bar connection thereby preventing corona discharge.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claim.

I claim:

A bus joint cover for covering an area at which bus bars are joined together to prevent corona formation from sharp edges and being comprised of two similar halves of solid rigid insulating material; each of said halves being contoured to envelop a bus bar joint and having their internal surfaces contoured to be physically spaced from irregular surfaces comprising the connection between bus bars; each of said halves being removably connected to said bus bar joint, and means to hold said halves in a connected position; said internal surfaces of each of said halves being smooth and being coated with a conductive coating; a resilient conductive contact having a substantially U-shaped configuration; said conductive contact being positioned to surround bus bars joined together within said cover and having its end portions extending toward and in contact with the conductive coating on the internal surfaces of said halves; said conductive contact providing a pressure contact engagement between the bus bars and said conductive coating to thereby cause said coating to assume the same potential as the ends of the bus bars.

References Cited in the file of this patent

UNITED STATES PATENTS

| | | |
|---|---|---|
| 1,934,442 | Newton | Nov. 7, 1933 |
| 2,274,422 | Mahoney et al. | Feb. 24, 1942 |
| 2,444,648 | Jackson | July 6, 1948 |